United States Patent [19]

Jung

[11] Patent Number: 4,551,751
[45] Date of Patent: Nov. 5, 1985

[54] COLOR REDUCTION DEPENDENT ON TONE

[75] Inventor: Eggert Jung, Schoenberg, Fed. Rep. of Germany

[73] Assignee: Dr. Ing. Rudolf Hell GmbH, Fed. Rep. of Germany

[21] Appl. No.: 479,733

[22] Filed: Mar. 28, 1983

[30] Foreign Application Priority Data

Apr. 10, 1982 [EP] European Pat. Off. ........ 82103090.5

[51] Int. Cl.⁴ ............................................. H04N 1/46
[52] U.S. Cl. .................................................... 358/75
[58] Field of Search ........................ 358/80, 79, 78, 77, 358/76, 75

[56] References Cited

U.S. PATENT DOCUMENTS

| | | | |
|---|---|---|---|
| 2,807,660 | 9/1957 | Rose | 178/5.4 |
| 2,981,792 | 4/1961 | Farber | 178/5.2 |
| 3,885,244 | 5/1975 | Keller | 358/80 |
| 4,346,402 | 8/1982 | Pugsley | 358/80 |
| 4,402,015 | 8/1983 | Yamada | 358/80 |
| 4,468,692 | 8/1984 | Yamada | 358/80 |
| 4,482,917 | 11/1984 | Gaulke | 358/80 |

OTHER PUBLICATIONS

FOGRA-Forschungsbericht 1.203, Untersuchungen Zur Veränderung des Farbsatzaufbaues durch geänderte für die Teilfarbe Schwarz von Günter Otschik, Chapter 3.1, p. 4.

*Primary Examiner*—Michael A. Masinick
*Attorney, Agent, or Firm*—Hill, Van Santen, Steadman & Simpson

[57] ABSTRACT

Given color reduction depending on tone in four-color printing, wherein the color components of the chromatic printing inks yellow, magenta and cyan are reduced and the amount of black printing ink is increased to compensate for such reduction, a achromatic synthesis is employed up to a gray tone value which corresponds to the full tone of the black printing ink employed and the color components of the chromatic printing inks are again increased proceeding from that gray tone value up to the maximum shadow in order to get desired densities in the overprint.

5 Claims, 9 Drawing Figures

COLOR REDUCTION DEPENDENT ON TONE

BACKGROUND OF THE INVENTION

1. Field of the Invention

The present invention relates to the field of printing technology, particularly four-color printing. The invention is more particularly concerned with color reduction in four-color printing dependent on tone, whereby the color components of the chromatic printing inks, yellow, magenta and cyan, are reduced and the amount of black printing ink is increased to compensate for this reduction.

2. Description of the Prior Art

As already known from the publication FOGRA-Forschungsbericht 1.203, Untersuchungen zur Veränderung des Farbsatzaufbaues durch geänderte Farbausuüge für die Teilfarbe Schwarz von Günter Otschik, at Page 4, right-hand column. Chapter 3.1, it is possible to work with a total reduction of chromatic inks, i.e., achromatic synthesis of the reproduction when an intensive black, i.e. an intensive but expensive printing ink "black", is available.

What is meant by total achromatic synthesis in reproduction technology is that printing is only carried out with black ink in the reproduction of gray tone values and in the extremely dark tones, i.e. that no chromatic color component is contained and printed in the color separations yellow, magenta and cyan in these image areas.

Using less expensive printing inks for the color black ink usually employed in practice, however, a gray cast occurs when 100% black ink is printed. For this reason, the color separations of the chromatic printing inks are not reduced to zero but, rather, a residue of chromatic ink, which leads to a higher density, is printed over the entire tone range in gray tones up to the deepest black shadow, whereby the residual value decreases progressively towards light tones.

Thereby, the danger exists that color casts will occur in the reproduction of gray tones in the entire tonal range when fluctuations occur in the equilibrium i.e. gray balance portions of the chromatic printing inks yellow (Y), magenta (M), and cyan (C), and this can easily occur during the printing process, according to the initially-mentioned FOGRA-Forschungsbericht, pp. 3–4, Chapters 1 and 2.

Another disadvantage in comparison to total achromatic synthesis is that, in case the gray tones are still reproduced by chromatic components, a high ink consumption of the chromatic ink occurs instead of using an intensive black ink.

SUMMARY OF THE INVENTION

It is therefore the object of the present invention to achieve a reliable gray balance and a low ink consumption.

According to the present invention, the above object is achieved in that a nearly achromatic synthesis is used up to a gray tone value which corresponds to the maximum or full tone of the black printing ink employed, and in that the color components of the chromatic printing inks rise again from a given gray tone value to the maximum shadow density.

According to a particular feature of the invention, the total achromatic synthesis format is employed up to the gray tone value which corresponds to the full tone of the black printing ink employed.

According to another feature of the invention, and proceeding from that gray tone value which corresponds to the full tone of the printing ink employed, the color components of the chromatic ink take values up to the shadow which lead to the same density values in the overprint which derive given a reproduction without color reduction.

Another feature of the invention is that, proceeding from a gray tone value which corresponds to the full tone of the black printing ink employed, the chromatic inks take values which, in the shadow depth, lead to maximally-possible density values in the overprint which depend on their respective printing inks and the printing method employed.

BRIEF DESCRIPTION OF THE DRAWINGS

Other objects, features and advantages of the invention, its organization, construction and mode of operation will be best understood from the following detailed description, taken in conjunction with the accompanying drawings, on which.

DESCRIPTION OF THE PREFERRED EMBODIMENTS

Figure 1A:
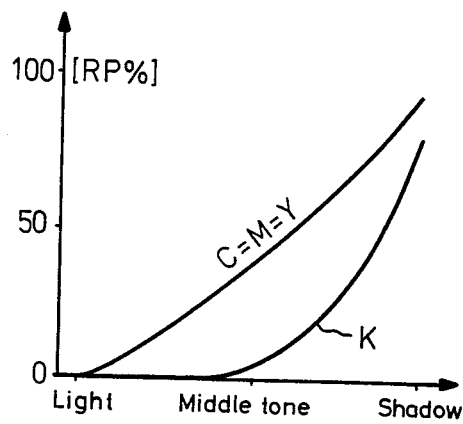
FIG. 1a is a curve of the color separation signals in the reproduction of gray tones without color reduction and without gray balance, as known in the art.

FIG. 1a illustrates the color separation signals over the tone range from light tones up to shadow from 0–100% dot size. The curve $C=M=Y$ represents the curve of the color separation signals of the chromatic inks cyan, magenta and yellow, respectively, as derived without color reduction in conjunction with the color separation signal for the black ink which is represented by the curve K. In the present example, 95% chromatic colors and 80% black are printed given the maximum density in the overprint.

Figure 1B:
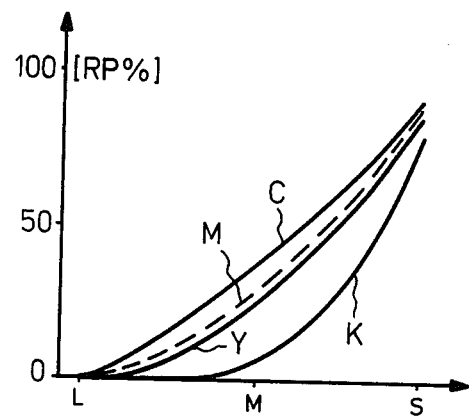
FIG. 1b is a curve of the color separation signals given a gray tone reproduction having gray balance, as also known in the prior art.

In FIG. 1b, the chromatic inks are not printed with the same dot size as in FIG. 1a but, rather, in order to achieve a gray balance, the inks cyan, magenta and yellow, represented by the respective curves C, M, Y, are printed with different components. As a result thereof, for example, in the offset method, color casts into brown in the overprint according to FIG. 1a are avoided.

Figure 2A:
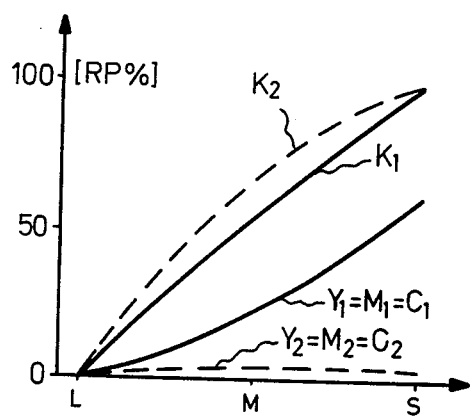
FIG. 2a is a curve of the color separation signals given color reduction without gray balance.

FIG. 2a illustrates the curves of color separation signals given a color reduction without consideration of the gray balance. The curves indicated with broken lines for $C_2$, $M_2$ and $Y_2$, as well as $K_2$, show that case in which an intensive black is employed and in which no chromatic colors are printed in the reproduction of gray tone value, i.e. a total achromatic synthesis is used.

The solid curve $Y_1=M_1=C_1$ shows the curve of the color separation signals when working with a less expensive black printing ink and with color reduction, i.e., when the black ink is printed in accordance with a curve $K_1$. In this case, no gray balance is taken into consideration, since the dot sizes of the chromatic inks are identical.

Figure 2B:
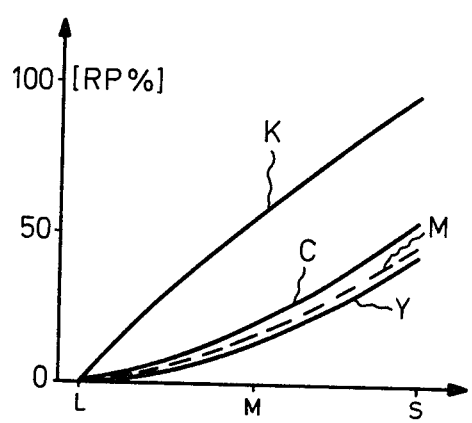
FIG. 2b is a curve of the color separation signals given the reproduction of a gray tone value upon color reduction and consideration of the gray balance.

In FIG. 2b, color reduction is likewise employed; the curve K illustrates the curve of the black separation and the curves C, M and Y show the dot sizes of the color separation signals upon consideration of the gray balance.

Figure 3A:
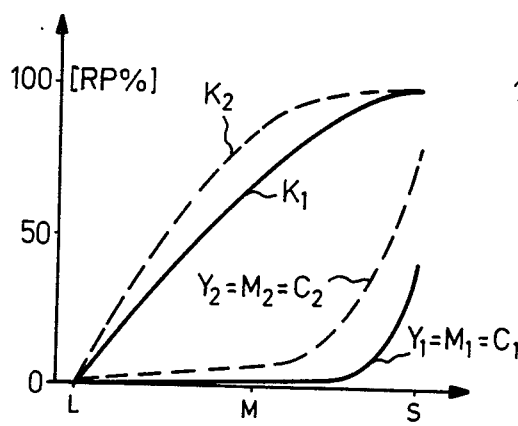
FIG. 3a is a curve of the color separation signals given color reduction dependent on tone without gray balance.

FIG. 3a shows how the color reduction according to the present invention is undertaken as a function of the tonal value. The curve progressions are specified for two different black printing inks, i.e. $K_1$ and $K_2$, whereby the solid curve $K_1$ belongs to the solid curve for the chromatic colors $Y_1$, $M_1$, $C_1$.

As can be seen from FIG. 3a, the total achromatic synthesis for the reproduction of gray tone values is retained as long as possible toward shadow tones, namely, up to a gray tone value which printed density corresponds to that of the full tone of the black printing ink employed. Proceeding from this gray tone value, the color components of the chromatic printing inks Y, M, C again increase, namely up to a value in the shadow which overprint density either corresponds to that density value which the chromatic colors would assume without color reduction for the reproduction of this gray tone or up to a prescribed value which derives from the respective printing method and the printing inks employed.

The curves $K_2$ and $Y_2$, $M_2$ and $C_2$, illustrated with broken lines, are representative for a different black printing ink, with a lower density for full tone-i.e. 100% than in the example of the curves $K_1$ and $Y_1$, $M_1$ and $C_1$. Given the cases illustrated in FIG. 3a, work was carried out without gray balance, i.e. these cases can be applied to printing methods wherein no color cast occurs in the overprint printing with equal components.

Figure 3B:
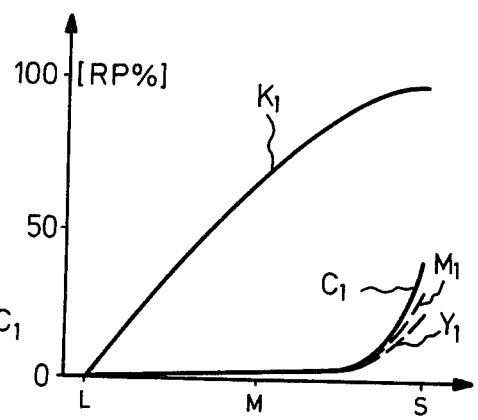
FIG. 3b is a curve of the color separation signals having gray balance.

FIG. 3b illustrates the results in which there is a consideration of the gray balance so that, depending upon the paper employed, the printing inks employed and the printing method, a neutral gray is printed without color casts in the shadow range. As already mentioned, the exact values with the individual chromatic inks and the black ink are printed depends on the black printing ink employed, on the quality of the chromatic inks, on the imprinted material and also on the respective printing method, but can be identified by one skilled in the art without further ado by, for example, colorimetry or, respectively, approximately by way of densitometric measurement of corresponding proofs or printing samples.

Figure 4:
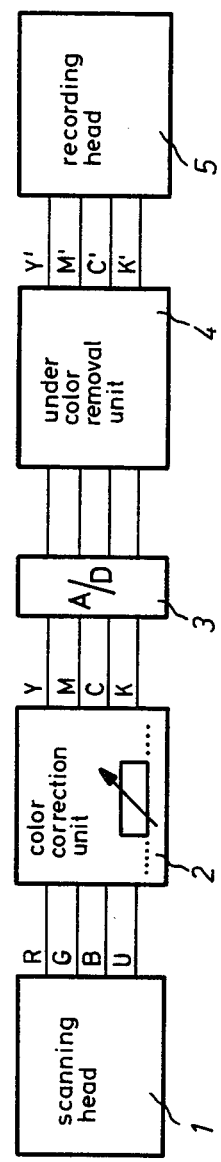
FIG. 4 is a block diagram of a system for practicing the present invention.

FIG. 4 illustrates the signal progression given an execution of the color reduction at a scanner. From a scanning head 1 which supplies the primary measured color values R, G and B as well as an outer field signal U which serves the purpose of electronic unsharp masking, the measured color values are fed to a color computer 2, herein designated a color correction unit, as disclosed for example, in U.S. Pat. No. 3,885,244, fully incorporated herein by the reference. The printing ink signals yellow (Y), magenta (M), cyan (C) and black (K) appear at the output of the color computer 2. The printing ink signals proceed in digital form to the color reduction circuit 4 by way of an analog/digital converter 3. According to the invention, the printing ink signals Y, M, C, K are converted in the color reduction circuit into modified printing ink signals Y', M', C' and K'. The color reduction circuit 4 comprises a memory which stores the values characteristic of the respective correction signals to convert the printing signals into the modified printing ink signals, the latter then being forwarded to a recording head 5 which then undertakes the recording of the modified printing ink signals. This circuit represents a simplified version of the scanner device illustrated in FIG. 4 of the aforementioned U.S. Pat. No. 3,885,244.

Figure 5:
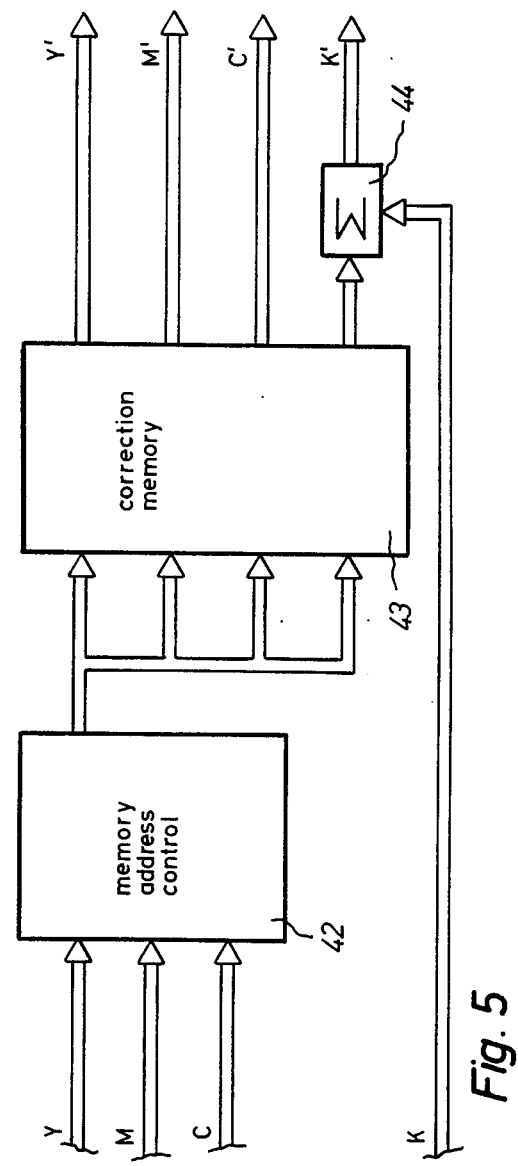
FIG. 5 is a block diagram of a circuit for executing color reduction in accordance with the present invention.

The color reduction circuit 4 is illustrated in greater detail in FIG. 5. The printing ink signals Y, M, C are fed to a memory 42 in which the signals are converted into input addresses for a conversion memory 43. For example, an analog/digital conversion is undertaken with 8 bits. In this case, the four more significant bits are employed for addressing the conversion memory. The output signals of the conversion memory 43, i.e. the printing ink signals Y', M', C' modified in accordance with the color correction, proceed to the recording head, in contrast whereto the output signal of the conversion memory for black is fed to a summer 44 which has a further input which receives the printing ink signal black K supplied by the analog/digital converter 3. The overall black signal, therefore, is a sum of the non-corrected black printing ink signal K and of the black output signal of the conversion memory and appears at the output of the summer 44. The conversion memory 43 can be realized, for example, by a plurality of look-up tables or, however, can also be an addressable memory having a corresponding plurality of memory locations. The input of the correction values occurs by way of the input 41.

Such a memory is illustrated, for example, in FIG. 1b of the British Letters Patent No. 1,541,554, whereby the input of the correction data occurs by way of a paper tape reader.

Figure 6:
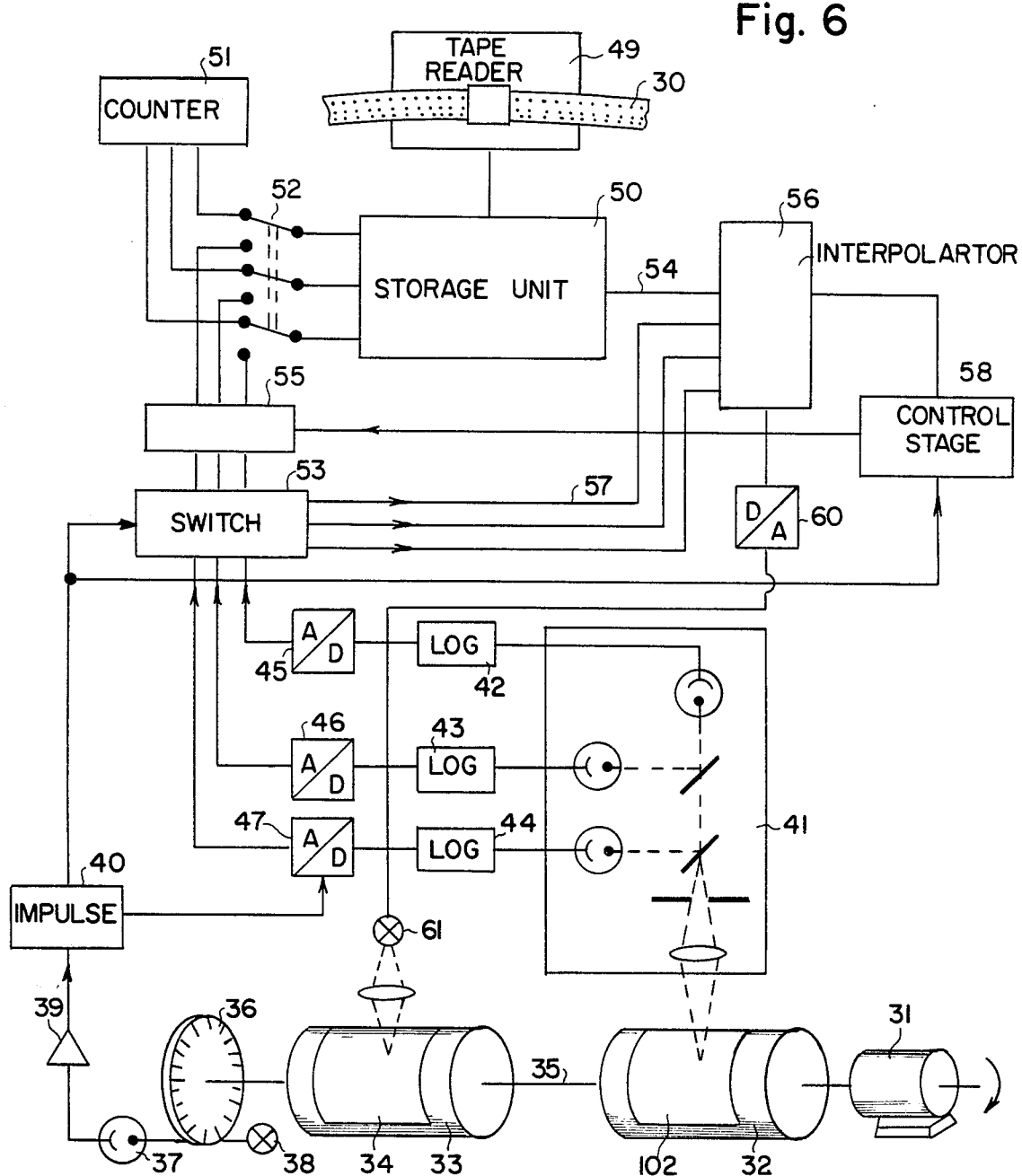
FIG. 6 illustrates the memory structure.

FIG. 6 shows a colour correcting station.

FIG. 6 shows a reproducing unit. It consists of a scanning drum 32, driven by a motor 31, to hold the original 62 and of a reproduction drum 33 on which the colour separations 34 are traced out. On a common shaft 35 is mounted a known screening disc 36 which supplies synchronized timing pulses to a timer 40 via light-beam device 37, 38 and an amplifier 39.

While the scanning drum 32 is rotating, the scanning unit 41 associated with the scanning drum 32, the spectral sensitivity of which should be the same as that of scanning unit delivers the three primary signals R, G, B for the colour values which are measured. These signals are fed, via logarithmic converters 142, 143 and 144 to analogue/digital converters which are controlled by timer 40. In these they are converted into digital signals which correspond to the gradations of tonal value. Thus, uncorrected digital signals for the colour values measured become available at the outputs of analogue/digital converters 45, 46 and 47.

The correcting process proper now takes place as follows:

The punched tape 30, which contains correcting data for the whole of the colour space, is now read by means of a punched-tape reader 49 and fed into the digital correcting store 50. So that the correlation between addresses and information, i.e. between graduations of tonal value and the actual tonal value, is the same as it was when the punched tape was being produced, a counter 51 runs in synchronization with the tape and its outputs supply a suitable timing signal to the address inputs of store 50 via a switch 52. After the corrected colour-proportion values have been fed in, switch 52 is changed over so that the correcting operation may take place and is switched to the picture signal derived from the scanning of the original.

In the embodiment of FIG. 6, the store 50 contains a framework of discrete colour-proportion values for the individual colour separations, are intermediate values are found by the known mathematical expedient of interpolation. The items of data supplied by analogue/-digital converters 45, 46 and 47 may for example each consist of an 8-bit combination. The three highest value bits are split off in a separating stage 53 and switched to store 50, the remaining 5 bits being needed for interpolation. The colour-proportion value which corresponds to the particular infed value in question then appears at output 54.

To obtain the colour-proportion values which mark out the areas surrounding the points defined by the three values 4, G, B in the colour space, there is provided an address raising unit 55 which is able to raise the addresses of the three part addresses, each of 3 bits by "1". In this way eight different addresses can be applied to the store and a total of eight values appear at output 54 of store 50. In the three-dimensional colour space this provides the corner points of a cube, which points surround the actual point to be reproduced. The actual colour-proportion value is calculated in interpolation stage 56 by linear interpolation. For this purpose the five lowest value bits are fed via lines 57 to interpolator 56. These represent the distances between the value to be reproduced and the corners of the cube formed by the eight correcting value.

Since the interpolation has to take place at a faster rate than that at which points are successively scanned on the original, a timing signal multiplier is connected to timer 40, this multiplier being part of a control unit 58 for the interpolation process. The results of interpolation are fed to a digital/analogue converter 60 which controls the reproduction unit 61 and reproduces the appropriate colour separation 34 on the drum 32.

A further possible application of the invention is to make different colour corrections in different part of the reproduction. For this purpose the first colour correction is performed a plurality of times and the colour proportion values stored a plurality of times, for which purpose there are a plurality of stores 50. Then, during reproduction, a change-over is made between the various stores as required by the various parts of the picture.

This change-over may be effected by means of a mask by means of a colour recognition circuit or by laying down coordinates by which a colour-recognition circuit which is used to switch between the stores is made "live".

Although I have described my invention by reference to particular illustrative embodiments thereof, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. In a color reduction method which is dependent on tone in four-color printing, in which the color components of the chromatic printing inks are reduced and the amount of black printing ink is increased for compensating such color reduction the steps of:

increasing the black printing ink signal on the basis of nearly complete achromatic synthesis up to a gray tone value which corresponds to the full tone of the black printing ink; the improvement comprising increasing the chromatic printing ink signals from this gray tone value up to the maximum shadow.

2. The improved method of claim 1, and proceeding from that gray tone value which corresponds to the full tone of the black printing ink, wherein said step of increasing the chromatic printing ink signals is further defined as;

increasing the chromatic printing ink signals in which the color components of the chromatic inks assume values up to the maximum shadow which lead to the same density values in the shadow which occur given a reproduction without color reduction.

3. The improved method of claim 1, and proceeding from a gray tone value which corresponds to the full tone of the black printing ink, wherein the step of increasing the chromatic printing ink signals is further defined as:

increasing the chromatic printing ink signals for which the chromatic inks assume values which, in the shadow, lead to maximally-possible density values which occur from the respective printing inks and the printing method employed.

4. In a color reduction method which is dependent on tone in four-color printing, in which the color components of the chromatic printing inks are reduced and the amount of black printing ink is increased for compensating such color reduction, increasing the black printing ink signal on the basis of total achromatic synthesis up to a gray tone value which corresponds to the full tone of the black printing ink; the improvement comprising increasing the chromatic printing ink signals from this gray tone value up to the maximum shadow.

5. The improved method of claim 4, and proceeding from a gray tone value which corresponds to the full tone of the black printing ink, wherein the step of increasing the chromatic printing ink signals is further defined as:

increasing the chromatic printing ink signals for which the chromatic colors assume values which, in the shadow, lead to maximally-possible density values which occur from the respective printing inks and the printing method employed.

* * * * *